United States Patent
Petushkov et al.

(10) Patent No.: US 9,827,560 B2
(45) Date of Patent: Nov. 28, 2017

(54) SMALL CRYSTAL FERRIERITE AND METHOD OF MAKING THE SAME

(71) Applicant: PQ Corporation, Valley Forge, PA (US)

(72) Inventors: Anton Petushkov, Lafayette Hill, PA (US); Hong-Xin Li, Lansdale, PA (US); William E. Cormier, Harleysville, PA (US)

(73) Assignee: PQ Corporation, Valley Forge, PA (US)

( * ) Notice: Subject to any disclaimer, the term of this patent is extended or adjusted under 35 U.S.C. 154(b) by 759 days.

(21) Appl. No.: 14/072,202

(22) Filed: Nov. 5, 2013

(65) Prior Publication Data

US 2014/0128248 A1 May 8, 2014

Related U.S. Application Data

(60) Provisional application No. 61/724,136, filed on Nov. 8, 2012.

(51) Int. Cl.
| | |
|---|---|
| *B01J 29/06* | (2006.01) |
| *C01B 39/44* | (2006.01) |
| *B01J 29/68* | (2006.01) |
| *B01J 29/67* | (2006.01) |
| *B01J 29/66* | (2006.01) |
| *C01B 39/04* | (2006.01) |
| *B01D 53/56* | (2006.01) |
| *B01D 53/94* | (2006.01) |
| *B01J 29/65* | (2006.01) |
| *B01J 35/00* | (2006.01) |
| *B01J 35/02* | (2006.01) |
| *B01J 35/10* | (2006.01) |
| *B01J 37/02* | (2006.01) |

(52) U.S. Cl.
CPC .............. *B01J 29/68* (2013.01); *B01D 53/56* (2013.01); *B01D 53/9413* (2013.01); *B01J 29/65* (2013.01); *B01J 29/66* (2013.01); *B01J 29/67* (2013.01); *B01J 35/002* (2013.01); *B01J 35/023* (2013.01); *B01J 35/1019* (2013.01); *C01B 39/04* (2013.01); *C01B 39/445* (2013.01); *B01D 53/9418* (2013.01); *B01D 2255/1021* (2013.01); *B01D 2255/1023* (2013.01); *B01D 2255/1025* (2013.01); *B01D 2255/1026* (2013.01); *B01D 2255/20738* (2013.01); *B01D 2255/20753* (2013.01); *B01D 2255/20761* (2013.01); *B01D 2255/50* (2013.01); *B01J 37/0201* (2013.01); *B01J 2229/186* (2013.01)

(58) Field of Classification Search
USPC ......... 502/60, 64, 66, 74; 423/700, 703, 704
See application file for complete search history.

(56) References Cited

U.S. PATENT DOCUMENTS

| | | | |
|---|---|---|---|
| 3,933,974 A | 1/1976 | Winquist | |
| 3,966,883 A | 6/1976 | Vaughan et al. | |
| 3,992,466 A | 11/1976 | Plank et al. | |
| 4,000,248 A | 12/1976 | Martin | |
| 4,016,245 A | 4/1977 | Plank et al. | |
| 4,088,739 A | 5/1978 | Vaughan et al. | |
| 4,251,499 A | 2/1981 | Nanne et al. | |
| 4,377,502 A | 3/1983 | Klotz | |
| 4,650,654 A | 3/1987 | Arika et al. | |
| 4,795,623 A | 1/1989 | Evans | |
| 5,041,272 A | 8/1991 | Tamura et al. | |
| 5,491,273 A | 2/1996 | Santiesteban et al. | |
| 5,985,238 A * | 11/1999 | Pasquale | B01J 29/65 423/706 |
| 6,136,289 A | 10/2000 | Szabo et al. | |
| 6,709,644 B2 * | 3/2004 | Zones | B01D 67/0051 423/213.2 |
| 7,160,831 B2 * | 1/2007 | Vaughn | C08F 10/00 502/208 |
| 7,524,788 B2 * | 4/2009 | Girotti | B01J 23/72 502/60 |
| 2005/0075526 A1 * | 4/2005 | Abrevaya | C07C 4/06 585/651 |
| 2005/0130832 A1 * | 6/2005 | Abrevaya | C07C 4/06 502/4 |

(Continued)

FOREIGN PATENT DOCUMENTS

| | | |
|---|---|---|
| EP | 2 133 309 A1 | 12/2009 |
| WO | 96/40587 A1 | 12/1996 |

OTHER PUBLICATIONS

Pinar et al., "Cooperatrive Structure Directing Role of the Cage-Forming Tetramethylammonium Cation and the Buliker Benzylmethylpyrrolidinium in the Synthesis of Zeolite Ferrierite", Chem Mater. 2007, 5617-5626.*

Pariente, "Cooperative structure directing effects in the synthesis of crystalline molecular sieves", Zeolites and Related Materials: Trends, Targets and Challenges, Proceedings of the 4th International FEZA Conference, 2008, 85-90.*

Almeida et al., "Synthesis of ferrierite by a new combination of co-structure-directing agents: 1,6-bis(N-methylpyrrolidinium)hexane and tetrametnylammonium", Microporous and Mesoporous Materials, 232, 2016, 218-226.*

(Continued)

*Primary Examiner* — Elizabeth Wood
(74) *Attorney, Agent, or Firm* — Finnegan, Henderson, Farabow, Garrett & Dunner, LLP

(57) ABSTRACT

There is disclosed a highly crystalline, small crystal, ferrierite zeolite prepared from a gel containing a source of silica, alumina, alkali metal and a combination of two templating agents. The resulting material includes ferrierite crystals having a particle size of about or less than about 200 nm. The desired crystal size can be achieved by using a specific composition of the gel. The purity of the material and the crystal size was determined by using X-ray powder diffraction and scanning electron microscopy. The material has excellent surface area and micropore volume as determined by nitrogen adsorption.

18 Claims, 11 Drawing Sheets

(56) References Cited

U.S. PATENT DOCUMENTS

2008/0318764 A1* 12/2008 Abrevaya .............. C07C 4/06
502/67

OTHER PUBLICATIONS

Pinar et al. "Synthesis of Ferrierite from Gels Containing a Mixture of Two Templates", Collect. Czech. Chem. Commun. 2007, vol. 72, Nos. 5-6, 666-678.*
Written Opinion of the International Search Authority for International Application No. PCT/US2013/068438 dated Feb. 3, 2014.
Pinar, et al., "Template-controlled acidity and catalytic activity of ferrierite crystals'", Journal of Catalysis, Academic Press, vol. 263, No. 2, www.elsevier.com/locate/jcat, pp. 258-265, (2009).
Valyocsik, et al., "Diamines as templates in zeolite crystallization", XP-002719107, Zeolites, vol. 5, pp. 123-125, (1985).
International Search Report from the European Patent Office in International Application No. PCT/US2013/068438 dated Mar. 2, 2014.
Pinar, A. et al. "Synthesis of Ferrierite from Gels Containing a Mixture of Two Templates", Collection of Czechoslovak Chemical Communications, 72, (2007), pp. 666-678.
Roman-Leshkoivet al., Impact of Controlling the Site Distribution of Al Atoms on Catalytic Properties in Ferrierite-Type Zeolites:, Journal of Physical Chemistry, 115, (2011), pp. 1096-1102.
Nishiyama, N. et al., "FER membrane synthesis by a vapor-phase transport method: its structure and separation characteristics", Microporous Materials, 12, (1997), pp. 293-303.
Khomane, R.B. et al., "Synthesis and Characterization of Ferrierite-Type Zeolite in the Presence of Nonionic Surfactants", Journal of Colloid and Interface Science, 236, (2001), pp. 208-213.
Chauhan, N.L. et al., "Synthesis of Zeolite Ferrierite—Role of Emulsifiers", Indian Journal of Chemical Technology, 18, (2011), pp. 335-342.
"Atlas of Zeolite Framework Types," ed. Baerlocher et al., Sixth Revised Edition (Elsevier 2007).

* cited by examiner

SMALL CRYSTAL FERRIERITE AND METHOD OF MAKING THE SAME

This application claims the benefit of domestic priority to U.S. Provisional Application No.: 61/724,136, filed Nov. 8, 2012, which is herein incorporated by reference in its entirety.

FIELD OF THE INVENTION

There is disclosed a method of preparing ferrierite zeolite with small crystal size, such as 200 nm or less. There is also disclosed a crystalline microporous material having the ferrierite ("FER") framework type made by the disclosed method, as well as catalysts made by the disclosed method.

BACKGROUND OF THE INVENTION

There are numerous cases of ferrierite synthesis described in the literature. Ferrierite has been synthesized from gels free of organic structure directing agents ("OSDA"), or templates, as shown in U.S. Pat. Nos. 3,933,974; 3,966,883; 4,088,739; and 4,650,654. Typically, synthesis of ferrierite in the absence of OSDAs does not provide good control of the crystal size and morphology.

Various OSDAs, specifically nitrogen-containing organic compounds, have also been employed in the synthesis of high purity ferrierite. Some examples include U.S. Pat. Nos. 4,000,248; 4,016,245; 4,251,499; 4,377,502; and 4,795,623. The use of organic templates allows for a decrease in the crystallization temperature and time, as stated in U.S. Pat. No. 4,000,248. U.S. Pat. No. 5,491,273 describes the synthesis of ferrierite crystals or around 0.5 microns and larger using pyrrolidine as the structure directing agent.

U.S. Pat. No. 6,136,289 describes the synthesis of ferrierite from organic-free gels containing boric acid. Ferrierite crystals of 0.5 micron size and larger were formed.

Pinar et al. (Collection of Czechoslovak Chemical Communications, vol. 72 (2007) pp. 666-78) showed a strong influence from tetramethylammonium ("TMA") cations on the crystallization of ferrierite from gels containing 1-benzyl-1-methylpyrrolidinium cations as the primary OSDA. Ferrierite crystals having an average size of about 10 microns were obtained. However, quartz was present in the synthesized ferrierite samples.

Roman-Leshkov et al. (Journal of Physical Chemistry C, vol. 115 (2011) pp. 1096-102) described the synthesis of ferrierite from a mixture of TMA and a cyclic amine having a different ring size. Thin plate-like crystals having a size over 1 micron were formed.

Nishiyama et al. (Microporous Materials, vol. 12 (1997) pp. 293-303) showed that ferrierite needle-shaped crystals having an average diameter of 30 nm were formed in the cavities of a porous alumina support. The important aspect of their work was that the crystal growth and size were physically constrained by the pore size of the support rather than the reaction gel composition or the crystallization conditions during the synthesis. This is further supported by the fact that the ferrierite crystals formed on the external surface of the porous alumina support had a size on the order of micrometers.

Khomaine et al. (Journal of Colloid and Interface Science, vol. 236 (2001) pp. 208-13) showed that by using varying amounts of a non-ionic surfactant in addition to a pyrrolidine template, the size of ferrierite crystals could be controlled in a range between 1 and 3 micrometers.

Chauhan et al. (Indian Journal of Chemical Technology, vol. 18 (2011) pp. 335-42) studied the effect of several cationic, anionic, and non-ionic emulsifiers on the crystallization of ferrierite.

In view of the foregoing, there is a need for a method of making a highly crystalline, small crystal ferrierite zeolite. It has been found that a synthesis process that includes a mixture of silica and alumina sources with water and an alkali source, as well as a combination of two organic structure directing agents, solves the foregoing need.

SUMMARY OF THE INVENTION

There is disclosed a ferrierite ("FER") zeolite having an individual crystal size of about or less than 200 nm. In one embodiment, a ferrierite zeolite is synthesized by preparing a mixture of silica and alumina sources with water and an alkali source, as well as a combination of two organic structure directing agents ("OSDA"). For example, there is disclosed a method that uses a first OSDA such as one that comprises a tetramethylammonium ("TMA") cation in hydroxide or salt form, and a second OSDA that is an organic compound capable of promoting the crystallization of ferrierite, such as pyrrolidine, 1,3-diaminopropane, piperidine, pyridine, 1-methylpyrrolidine, ethylene diamine, or 1,4-diaminobutane.

There is also disclosed a method of preparing a crystalline microporous material having a FER framework type, a molar silica to alumina ratio ("SAR") of greater than about 10, and a mean crystal size of 200 nm or less. In one embodiment, the method comprises:

forming a synthesis mixture comprising a silica source, an alumina source, an alkali metal source, and organic structure directing agents comprising: a first organic structure directing agent (OSDA-1), and a second organic structure directing agent (OSDA-2) that promotes ferrierite structure formation, where the molar ratio of OSDA-1 to OSDA-2 ranges from about 0.2 to about 1.0; and heating the synthesis mixture to a temperature ranging from 100 to 250° C., preferably from 120 to 200° C., for a period of time sufficient to crystallize the material.

In one embodiment, the resulting gel is heated until a crystalline product is obtained. Different ratios between the components of the gel, as well as different crystallization conditions lead to the formation of different crystals, each having a particular size, morphology and crystal size distribution.

There is also disclosed a catalyst comprising a crystalline microporous material having the FER framework type, a molar silica to alumina ratio ("SAR") of greater than about 10, and a mean crystal size of about 200 nm or less, wherein the catalyst is catalytically active for at least one process chosen from hydrocarbon conversions, selective catalytic reduction of nitrogen oxides, and catalytic decomposition of nitrous oxide.

In one embodiment, the catalyst described herein further comprises at least one hydrogenation-function metal for hydrocarbon conversions, such as at least one hydrogenation-function metal chosen from Pt, Pd, Rh, Ru, Ni, Re, or mixtures thereof.

The catalyst described herein may also comprise at least one transition metal, such as Cu or Fe, for selective catalytic reduction of nitrogen oxides and/or catalytic decomposition of nitrous oxide.

Aside from the subject matter discussed above, the present disclosure includes a number of other exemplary features such as those explained hereinafter. It is to be understood that both the foregoing description and the following description are exemplary only.

BRIEF DESCRIPTION OF FIGURES

The accompanying figures are incorporated in, and constitute a part of this specification.

DETAILED DESCRIPTION OF THE INVENTION

Definitions

Figure 1:
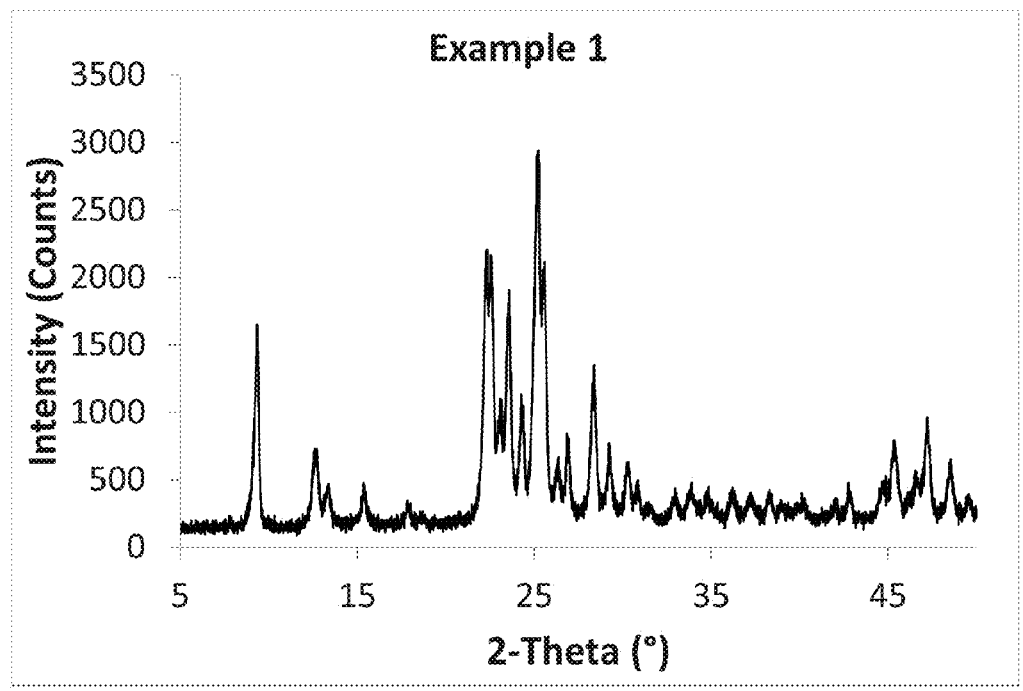
FIG. 1 is an XRD pattern of ferrierite material described in Example 1.

The following terms or phrases used in the present disclosure have the meanings outlined below:

"Defined by the Structure Commission of the International Zeolite Association," is intended to mean those structures included in, but not limited to, the structures described in "Atlas of Zeolite Framework Types," ed. Baerlocher et al., Sixth Revised Edition (Elsevier 2007), which is herein incorporated by reference in its entirety.

"Having the FER framework type" is intended to mean zeolite minerals belonging to the ferrierite group, as defined by the Structure Commission of the International Zeolite Association.

"Hydrogenation-function metal for hydrocarbon conversions" is intended to mean a metal that can catalyze hydrogenation reaction in hydrocarbon conversion processes.

"Selective Catalytic Reduction" or "SCR" refers to the reduction of $NO_x$ (typically with ammonia, ammonia generating compound such as urea, or hydrocarbon) in the presence of oxygen to form nitrogen and $H_2O$. The reduction is catalyzed to preferentially promote the reduction of NO over the oxidation of ammonia by the oxygen, hence "selective catalytic reduction."

The phrases "chosen from" or "selected from" as used herein refer to selection of individual components or the combination of two (or more) components. For example, the phrase "the transition metal may be chosen from copper and iron" means that the metal may comprise copper, or iron, or a combination of copper and iron.

Preparation of a small crystal ferrierite according to the present disclosure is largely but not solely dependent on the precursor gel composition. In one embodiment, the presence of two organic structure directing agents, or templates, is an important condition for controlling the ferrierite crystal size. Examples of silica sources include, but are not limited to, sodium silicate, colloidal silica and precipitated silica. Examples of alumina sources include, but are not limited to, aluminum isopropoxide, sodium aluminate, and a combination of alumina and sodium hydroxide. Tetramethylammonium ("TMA") cation is used in the form of hydroxide or salt, such as chloride, bromide or iodide.

In one embodiment, the second template can be pyrrolidine, 1,3-diaminopropane, piperidine, pyridine, 1-methylpyrrolidine, ethylene diamine, 1,4-diaminobutane or any organic structure directing agent ("OSDA") that promotes crystallization of ferrierite zeolite. Ferrierite seed crystals are optionally added to the mixture to further assist with the rate of crystallization.

In one embodiment, the sources of silica and alumina, water, sodium hydroxide, templates, and optionally seeds are combined together and the resulting gel is thoroughly mixed.

The overall composition of the gel is described as:

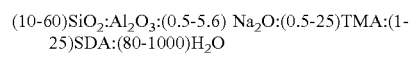

where TMA denotes tetramethylammonium, and SDA denotes the second template molecule, such as pyrrolidine, 1,3-diaminopropane, piperidine, pyridine, 1-methylpyrrolidine, ethylene diamine, 1,4-diaminobutane or any OSDA suitable for synthesis of ferrierite zeolite.

The morphology of ferrierite crystals may change depending on the ratio between the two templates. The molar ratio between TMA and the second template can range from about 0.20 to about 1, such as from about 0.25 to about 0.80, or even from about 0.30 to about 0.70. The molar ratio of the second template relative to silica can be chosen from a reasonably wide range, such as from about 0.02 to about 0.80, or even from about 0.10 to about 0.40. The ratio of hydroxide ("OH") to $SiO_2$ is also an important factor for controlling the size and shape of the crystals. In one embodiment, the ratio of OH to $SiO_2$ can range from about 0.15 to about 0.30. Lower $OH/SiO_2$ ratios may result in undesired crystal size, while higher ratios may lead to the formation of impurities, such as ZSM-5, quartz or tridymite.

The OH/SiO$_2$ ratio may be controlled by using sodium hydroxide or its combination with tetramethylammonium hydroxide. When sodium hydroxide alone is used for controlling the OH/SiO$_2$ ratio, the Na$_2$O/SiO$_2$ ratio typically ranges from about 0.05 to about 0.14, such as from about 0.07 to about 0.13. This ratio can be somewhat decreased if sodium hydroxide is used in combination with tetramethylammonium hydroxide.

The gels are heated under autogenous conditions at temperatures ranging from 100 to 250° C., preferably from 120 to 200° C. The ferrierite phase typically crystallizes within 48 hours of heating.

Ferrierite seeds can be added to the gel to decrease the crystallization time. In one embodiment, a ferrierite zeolite, for example CP 914C (Zeolyst International), can be used for seeding.

In one embodiment, the resulting ferrierite product is pure ferrierite and does not contain any other zeolitic or condensed silica impurities. The ferrierite has a surface area of at least about 350 m$^2$/g, or even at least about 380 m$^2$/g. The ferrierite crystals have an irregular shape. The average crystal size along all crystal dimensions is about or less than 200 nm as determined by Scanning Electron Microscopy ("SEM").

The resulting ferrierite can be converted to NH$_4$-form, H-form, or loaded with metals either by impregnation or ion-exchange, for catalytic conversions of hydrocarbons, selective catalytic reduction of nitrogen oxides, or catalytic decomposition of nitrous oxide.

In one embodiment, the ferrierite may be used as an inventive catalyst in a method for SCR of exhaust gases, such as by contacting the gas mixture with the ferrierite composition described herein.

Embodiments of the invention will be further clarified by the following non-limiting examples, which are intended to be purely exemplary of the invention.

EXAMPLES

Example 1

This example illustrates the synthesis of a small crystal ferrierite according to one embodiment of the present invention. The molar composition of the gel was as follows:

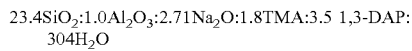

485 grams of water was combined with 28.9 grams of sodium hydroxide (50% w/w solution), 74.1 grams of sodium aluminate solution (23.5% wt. Al$_2$O$_3$, 19.6% wt. Na$_2$O) to form an aqueous solution. 65.6 grams of tetramethylammonium chloride solution (50% w/w, Sachem) and 44.8 grams of 1,3-diaminopropane ("1,3-DAP") (Sigma Aldrich) were mixed in to the aqueous solution. Finally, 600 grams of silica sol (40% wt. SiO$_2$, Nyacol) and 2.7 grams of CP 914C seeds (Zeolyst International) were added, and the resulting gel was stirred until it became homogenous.

Figure 2:
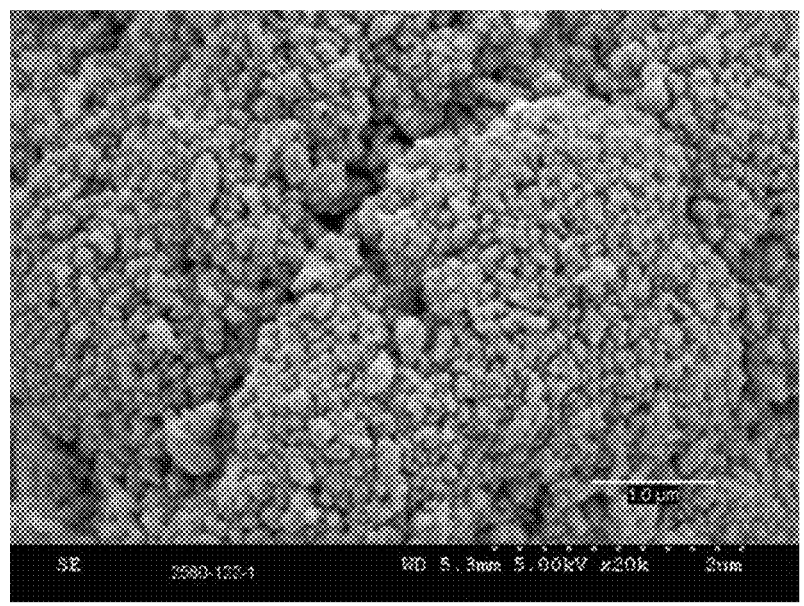
FIG. 2 is an SEM of ferrierite material described in Example 1.

The gel was heated at 180° C. for 36 hours. The resulting crystalline product was filtered, washed with deionized water and dried in air at 105° C. The resulting zeolite powder was calcined at 550° C. for 6 hours to remove the organic molecules from the pores. The calcined sample had a surface area of 395 m$^2$/g and micropore volume of 0.14 cc/g, as determined by nitrogen adsorption. The sample was found to be pure phase ferrierite. The X-ray diffraction pattern of the sample is shown in FIG. 1. The crystal size of the sample was about 100 nm or less, as shown in the SEM image of FIG. 2.

Example 2

This example describes the synthesis of a small crystal ferrierite material from a gel having a lower H$_2$O/SiO$_2$ ratio than that of Example 1. The molar composition of the gel was as follows:

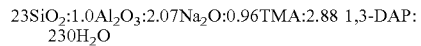

320 grams of water was combined with 12.0 grams of sodium hydroxide aqueous solution (50% w/w), 94.5 grams of sodium aluminate solution (23.5% wt. Al$_2$O$_3$, 19.6% wt. Na$_2$O) to form an aqueous solution. 41.9 grams of tetramethylammonium chloride solution (50% w/w, Sachem) and 42.9 grams of 1,3-diaminopropane ("1,3-DAP") (SigmaAldrich) were mixed in to the aqueous solution. Finally, 700 grams of silica sol (39.4% wt. SiO$_2$, Nyacol 1440) and 3.1 grams of CP 914C seeds (Zeolyst International) were added, and the resulting gel was stirred until it became homogenous.

Figure 3:
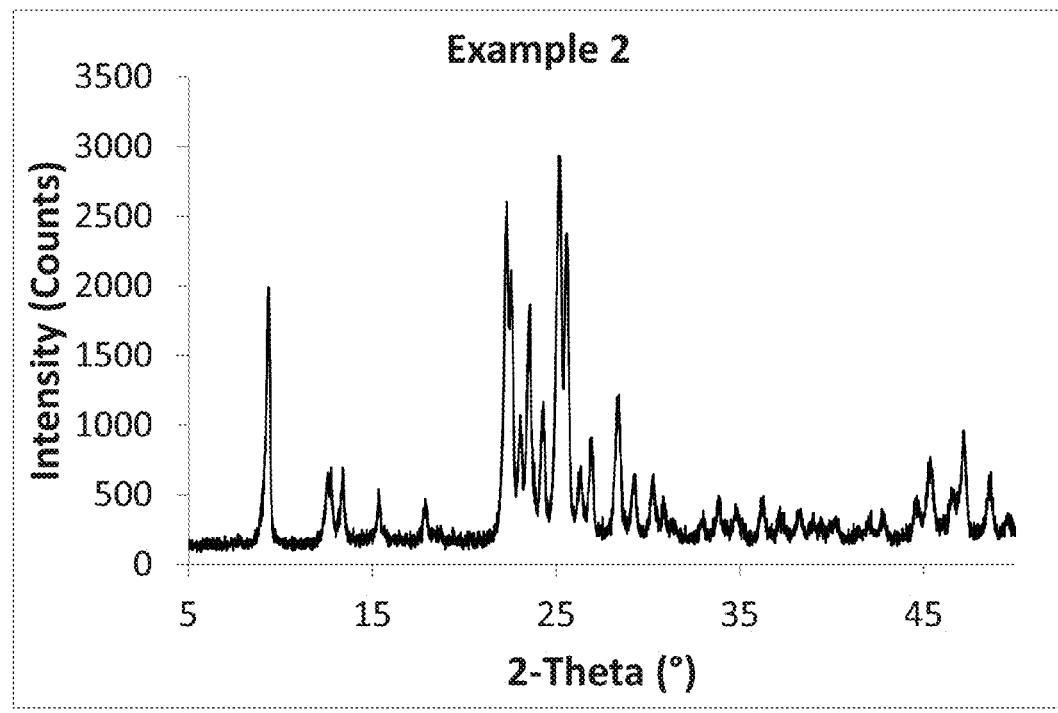
FIG. 3 is an XRD pattern of ferrierite material described in Example 2.
Figure 4:
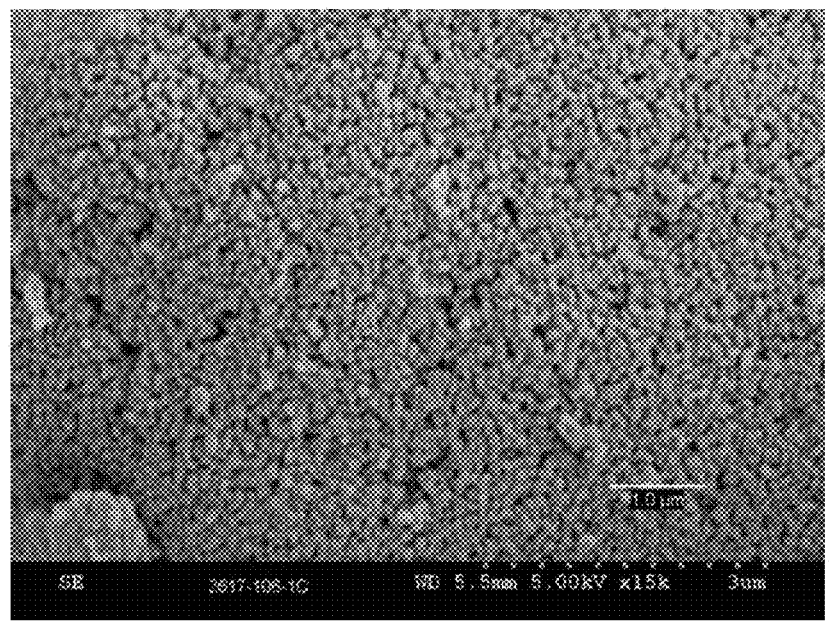
FIG. 4 is an SEM of ferrierite material described in Example 2.

The gel was heated at 180° C. for 36 hours. The resulting crystalline product was filtered, washed with deionized water and dried in air at 105° C. The resulting zeolite powder was calcined at 550° C. for 6 hours to remove the organic molecules from the pores. The calcined sample had a surface area of 406 m$^2$/g and micropore volume of 0.14 cc/g, as determined by nitrogen adsorption. The sample was found to be pure phase ferrierite. The X-ray diffraction pattern of the sample is shown in FIG. 3. The crystal size of the sample was about or less than about 100 nm, as shown in the SEM image of FIG. 4.

Example 3

This example describes the synthesis of a small crystal ferrierite material having a higher SAR than that of Example 1. The molar composition of the gel was as follows:

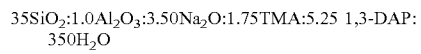

391 grams of water was combined with 42.3 grams of sodium hydroxide (50% w/w solution), 64.3 grams of sodium aluminate solution (23.5% wt. Al$_2$O$_3$, 19.6% wt. Na$_2$O) to form an aqueous solution. 58.3 grams of tetramethylammonium chloride solution (50% w/w, Sachem) and 59.8 grams of 1,3-diaminopropane ("1,3-DAP") (SigmaAldrich) were mixed in to the aqueous solution. Finally, 800 grams of silica sol (40% wt. SiO$_2$, Nyacol) and 3.4 grams of CP 914C seeds (Zeolyst International) were added, and the resulting gel was stirred until it became homogenous.

Figure 5:
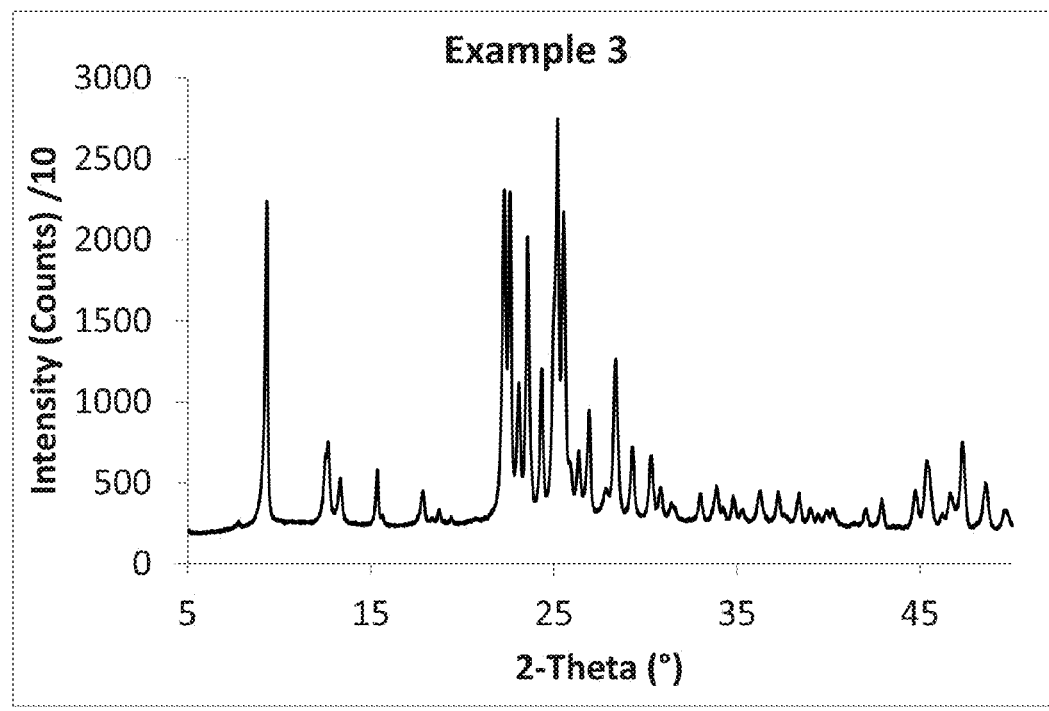
FIG. 5 is an XRD pattern of ferrierite material described in Example 3.
Figure 6:
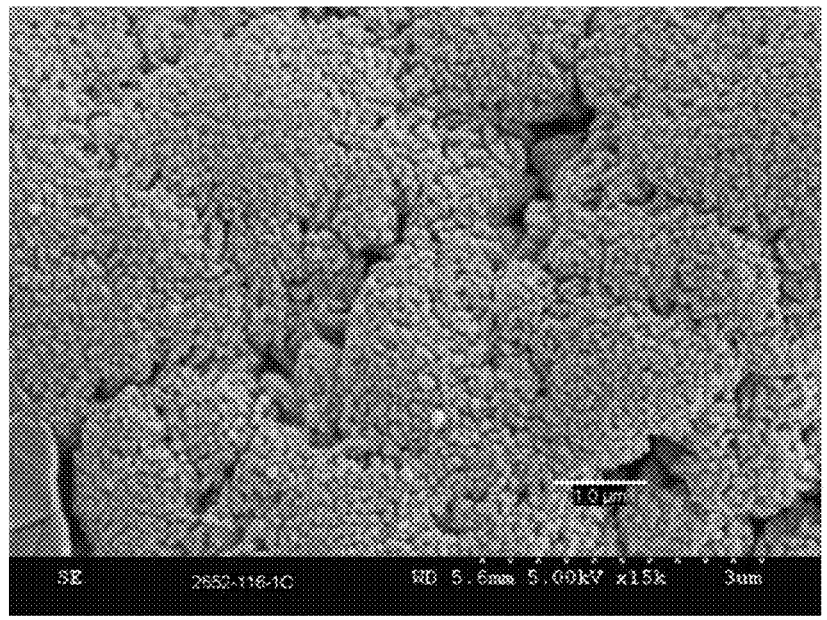
FIG. 6 is an SEM of ferrierite material described in Example 3.

The gel was heated at 160° C. for 48 hours. The resulting crystalline product was filtered, washed with deionized water and dried in air at 105° C. The resulting zeolite powder was calcined at 550° C. for 6 hours to remove the organic molecules from the pores. The calcined sample had a surface area of 382 m$^2$/g and micropore volume of 0.14 cc/g, as determined by nitrogen adsorption. The sample was found to be pure phase ferrierite. The X-ray diffraction pattern of the sample is shown in FIG. 5. The crystal size of the sample was about or less than about 100 nm, as shown in the SEM image of FIG. 6.

Example 4

This example describes the synthesis of a small crystal ferrierite material having a higher SAR and a different source of silica than those of Example 1. The molar composition of the gel was as follows:

35SiO$_2$:1.0Al$_2$O$_3$:3.50Na$_2$O:1.75TMA:5.25 1,3-DAP: 350H$_2$O 724 grams of water was combined with 45.3 grams of sodium hydroxide (50% w/w solution), 56.7 grams of sodium aluminate solution (23.5% wt. Al$_2$O$_3$, 19.6% wt. Na$_2$O) to form an aqueous solution. 50.6 grams of tetramethylammonium chloride solution (50% w/w, Sachem) and 51.9 grams of 1,3-diaminopropane (1,3-DAP) (SigmaAldrich) were mixed in to the aqueous solution. Finally, 300 grams of precipitated silica (HiSil 233, PPG Industries) and 3.0 grams of CP 914C seeds (Zeolyst International) were added, and the resulting gel was stirred until it became homogenous.

Figure 7:
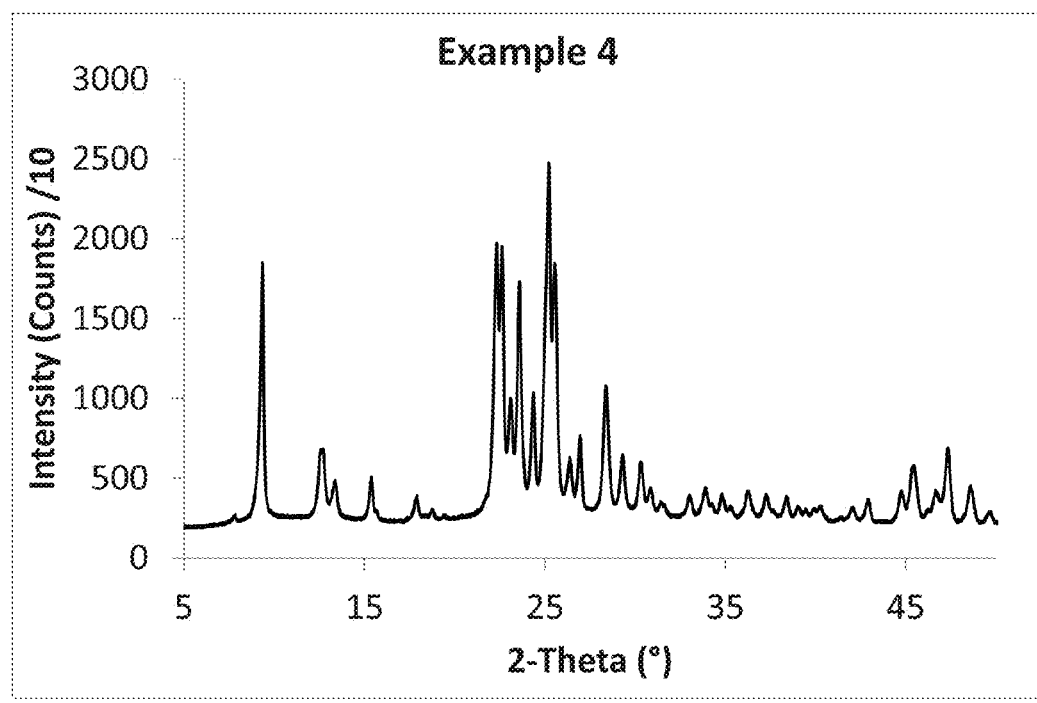
FIG. 7 is an XRD pattern of ferrierite material described in Example 4.
Figure 8:
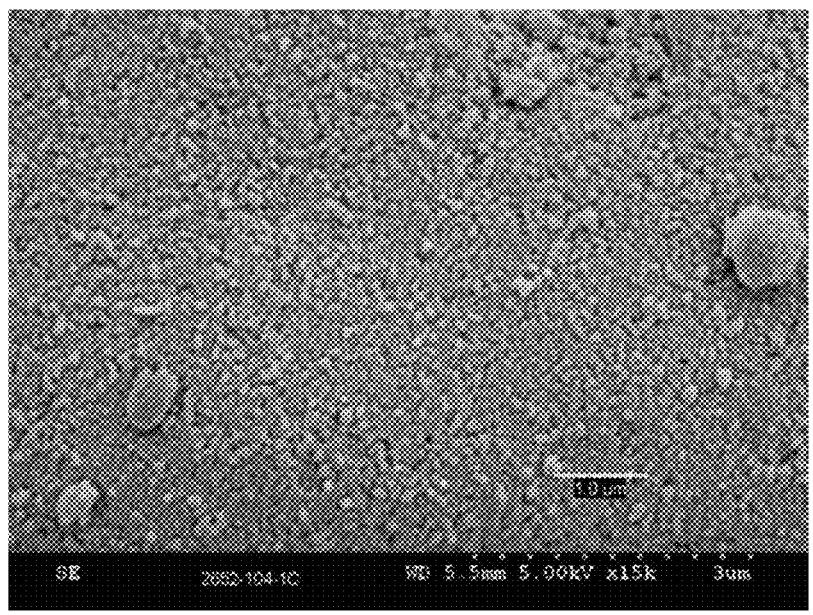
FIG. 8 is an SEM of ferrierite material described in Example 4.

The gel was heated at 160° C. for 48 hours. The resulting crystalline product was filtered, washed with deionized water and dried in air at 105° C. The resulting zeolite powder was calcined at 550° C. for 6 hours to remove the organic molecules from the pores. The calcined sample had a surface area of 405 m$^2$/g and micropore volume of 0.14 cc/g, as determined by nitrogen adsorption. The sample was found to be pure phase ferrierite. The X-ray diffraction pattern of the sample is shown in FIG. 7. The crystal size of the sample was about or less than about 100 nm, as shown in the SEM image of FIG. 8.

Comparable Example 5

Figure 9:
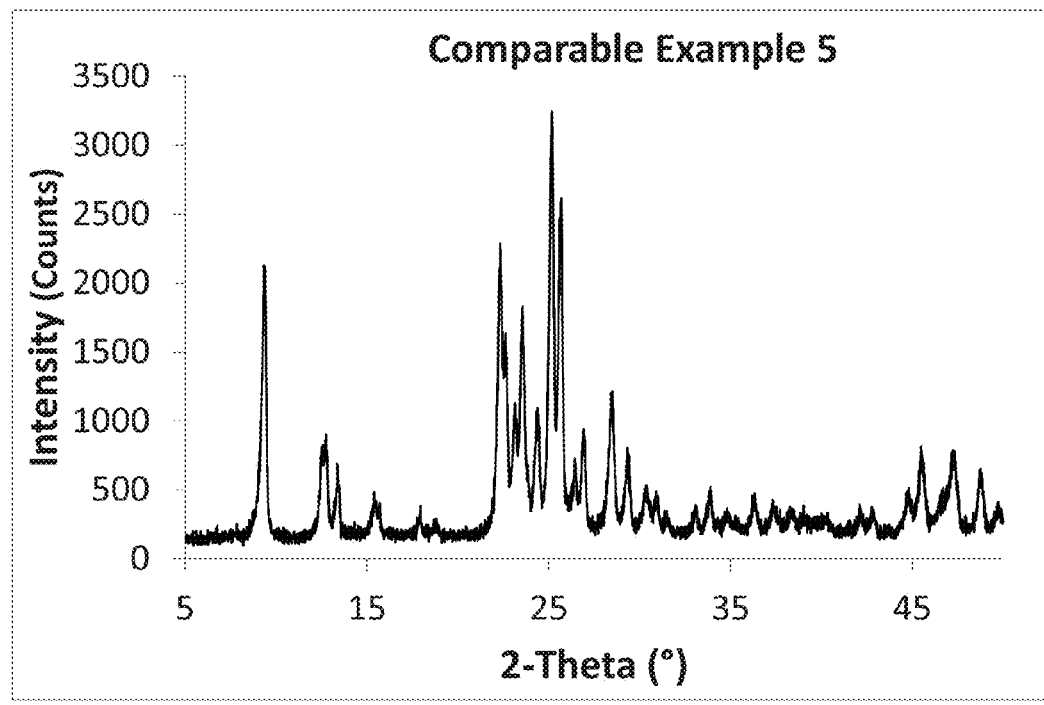
FIG. 9 is an XRD pattern of ferrierite material described in Comparable Example 5.
Figure 10:
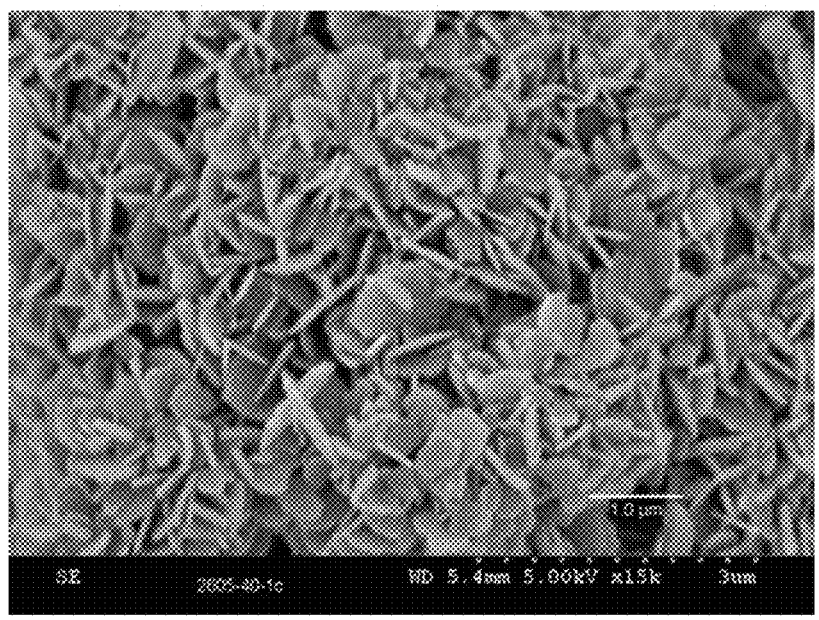
FIG. 10 is an SEM of ferrierite material described in Comparable Example 5.

This example illustrates a comparable method of ferrierite zeolite synthesis in the absence of tetramethylammonium cations. The molar composition of the gel was as follows:

23.4SiO$_2$:1.0Al$_2$O$_3$:1.65Na$_2$O:2.34 1,3-DAP:304H$_2$O 535 grams of water, 74.1 grams of sodium aluminate solution (23.5% wt. Al$_2$O$_3$, 19.6% wt. Na$_2$O), and 29.9 grams of 1,3-diaminopropane were combined together to form an aqueous solution. Finally, 600 grams of silica sol (40% wt. SiO$_2$, Nyacol) and 2.7 grams of CP 914C seeds (Zeolyst International) were added, and the resulting gel was stirred until it became homogenous. The gel was heated at 180° C. for 36 hours. The sample was found to be pure phase ferrierite. The X-ray diffraction pattern of the sample is shown in FIG. 9. Plate-like ferrierite crystals having a particle size of about 300 nm to about 1000 nm were formed, as shown in the SEM image of FIG. 10.

Comparable Example 6

This example illustrates a comparable ferrierite zeolite synthesis. The molar composition of the gel was as follows:

23.4SiO$_2$:1.0Al$_2$O$_3$:1.65Na$_2$O:1.8TMA:3.5 1,3-DAP: 304H$_2$O 503 grams of water was combined with 74.1 grams of sodium aluminate solution (23.5% wt. Al$_2$O$_3$, 19.6% wt. Na$_2$O) to form an aqueous solution. 65.6 grams of tetramethylammonium chloride solution (50% w/w, Sachem) and 44.8 grams of 1,3-diaminopropane ("1,3-DAP") (SigmaAldrich) were mixed in to the aqueous solution. Finally, 600 grams of silica sol (40% wt. SiO$_2$, Nyacol) and 2.7 grams of CP 914C seeds (Zeolyst International) were added, and the resulting gel was stirred until it became homogenous.

Figure 11:
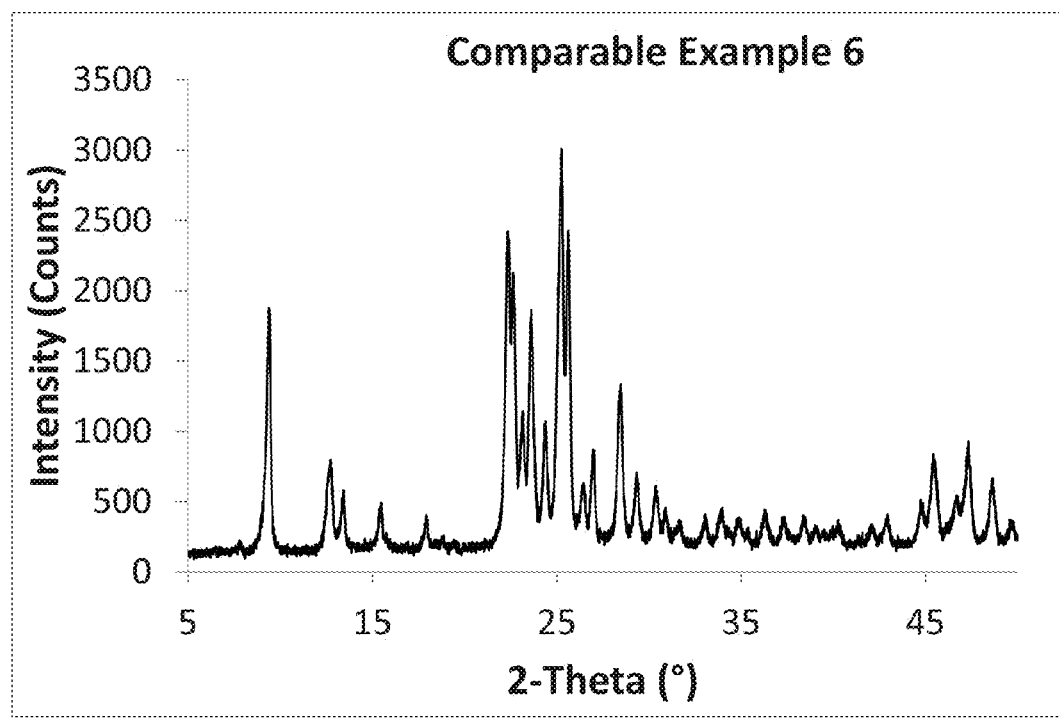
FIG. 11 is an XRD pattern of ferrierite material described in Comparable Example 6.
Figure 12:
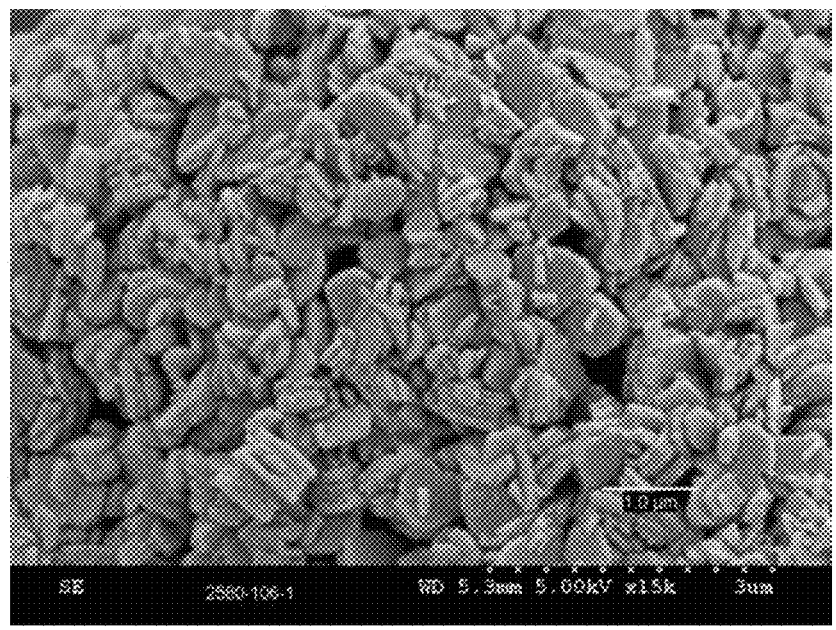
FIG. 12 is an SEM of ferrierite material described in Comparable Example 6.

The gel was heated at 180° C. for 36 hours. The resulting crystalline product was filtered, washed with deionized water and dried in air at 105° C. The resulting zeolite powder was calcined at 550° C. for 6 hours to remove the organic molecules from the pores. The calcined sample had a surface area of 392 m$^2$/g and micropore volume of 0.14 cc/g, as determined by nitrogen adsorption. The sample was found to be pure phase ferrierite. The X-ray diffraction pattern of the sample is shown in FIG. 11. The crystal size of the sample was between about 300 nm and about 1000 nm, as shown in the SEM image of FIG. 12.

Comparable Example 7

Figure 13:
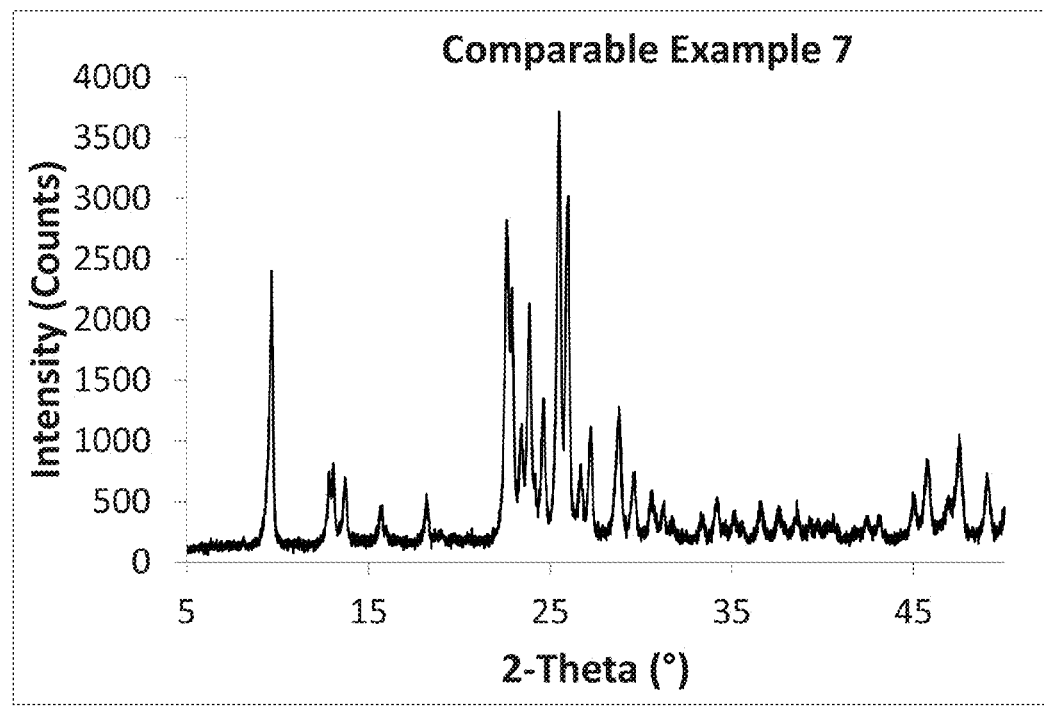
FIG. 13 is an XRD pattern of ferrierite material described in Comparable Example 7.
Figure 14:
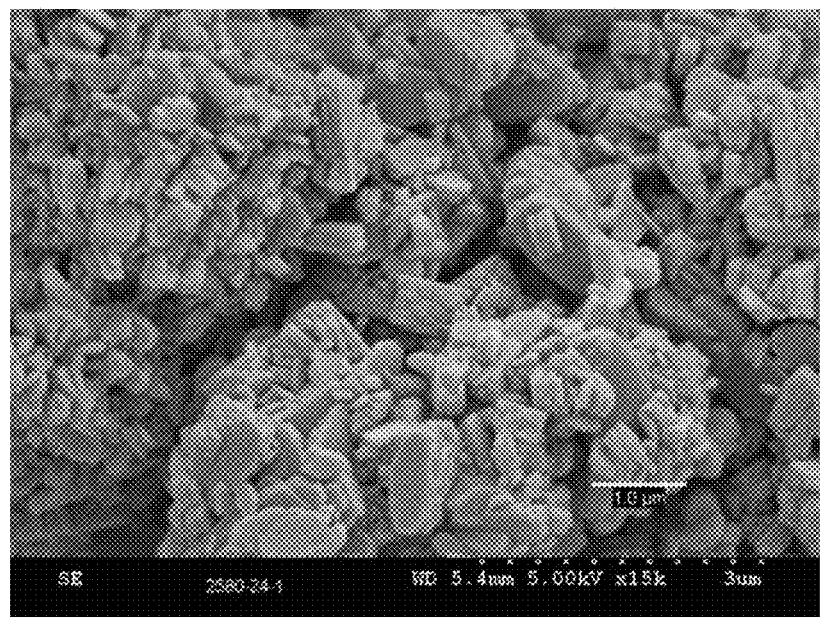
FIG. 14 is an SEM of ferrierite material described in Comparable Example 7.

This example illustrates a comparable method of ferrierite zeolite synthesis. The molar composition of the gel was as follows:

25SiO$_2$:1.0Al$_2$O$_3$:3.35Na$_2$O:3.75Pyrrolidine:325H$_2$O 544 grams of water, 69.4 grams of sodium aluminate solution (23.5% wt. Al$_2$O$_3$, 19.6% wt. Na$_2$O) and 42.6 grams of pyrrolidine were combined together. Finally, 600 grams of silica sol (40% wt. SiO$_2$, Nyacol) and 2.6 grams of CP914C seeds (Zeolyst International) were added, and the resulting gel was stirred until it became homogenous. The gel was heated at 170° C. for 36 hours. The sample was found to be pure phase ferrierite. The X-ray diffraction pattern of the sample is shown in FIG. 13. Ferrierite crystals having a particle size of about 300 nm to about 1500 nm size were formed, as shown in the SEM image of FIG. 14.

Comparable Example 8

Figure 15:
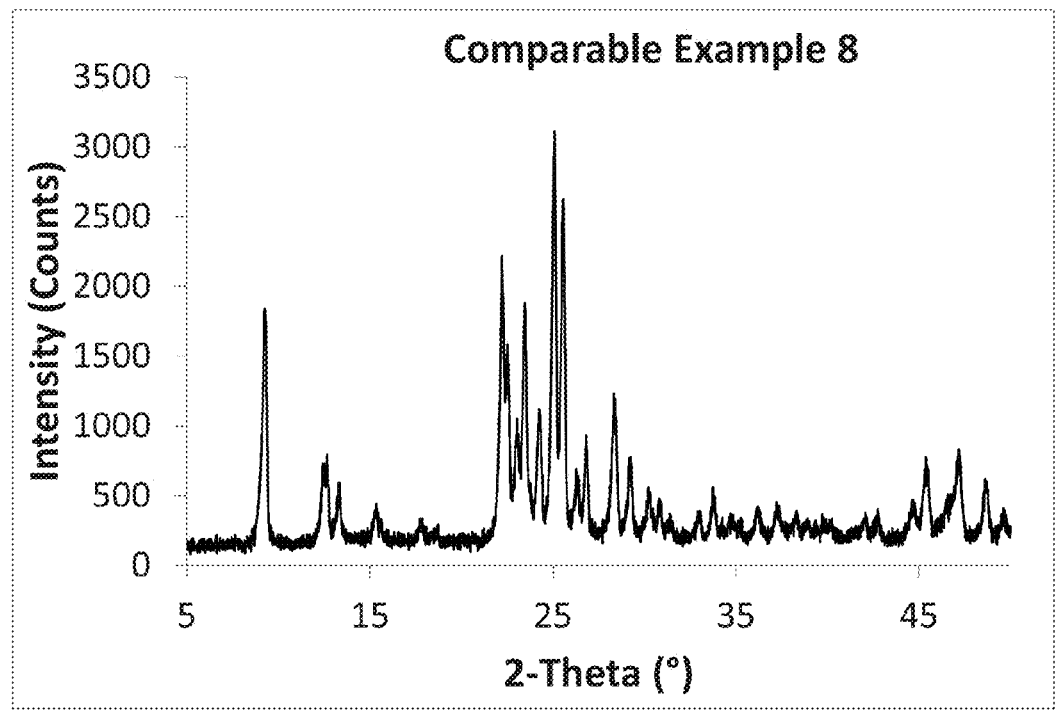
FIG. 15 is an XRD pattern of ferrierite material described in Comparable Example 8.
Figure 16:
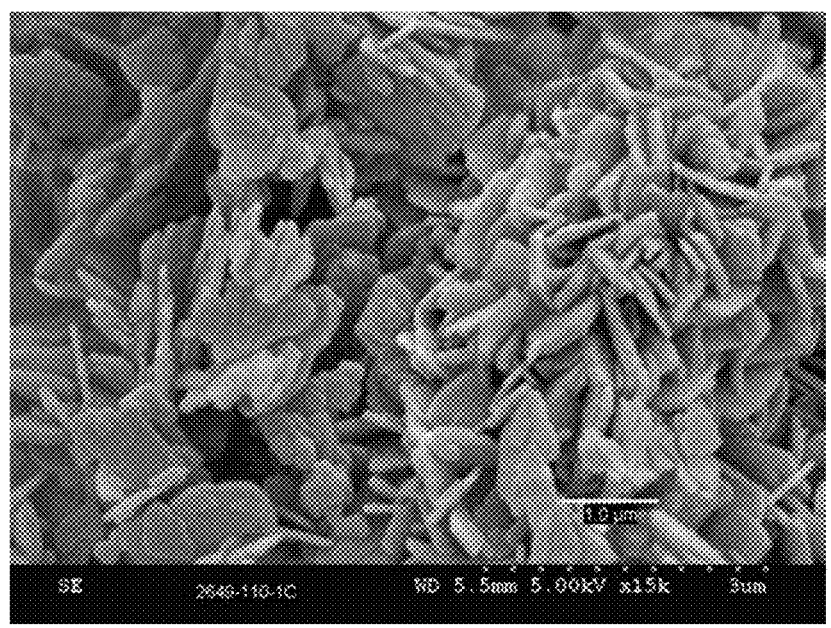
FIG. 16 is an SEM of ferrierite material described in Comparable Example 8.

This example describes the synthesis of ferrierite zeolite in the absence of tetramethylammonium cations and having a higher Na$_2$O/SiO$_2$ ratio than that of Example 5. The molar composition of the gel was as follows:

23.4SiO$_2$:1.0Al$_2$O$_3$:2.71Na$_2$O:3.51 1,3-diaminopropane:304H$_2$O 604 grams of water was combined with 33.7 grams of sodium hydroxide (50% w/w solution), 86.4 grams of sodium aluminate solution (23.5% wt. Al$_2$O$_3$, 19.6% wt. Na$_2$O) to form an aqueous solution. 52.3 grams of 1,3-diaminopropane ("1,3-DAP") (SigmaAldrich) was mixed in to the aqueous solution. Finally, 700 grams of silica sol (40% wt. SiO$_2$, Nyacol) and 3.0 grams of CP 914C seeds (Zeolyst International) were added, and the resulting gel was stirred until it became homogenous. The gel was heated at 180° C. for 36 hours. The resulting sample was found to be pure phase ferrierite. The X-ray diffraction pattern of the sample is shown in FIG. 15. Ferrierite having plate-like crystals of about 300 nm to about 500 nm in size were formed, as shown in the SEM image of FIG. 16.

Comparable Example 9

This example illustrates the synthesis of a ferrierite material from a gel having a composition similar to that used for small crystal ferrierite synthesis, when the gel is allowed to crystallize in the absence of stirring:

23SiO$_2$:1.0Al$_2$O$_3$:2.1Na$_2$O:0.97TMA:2.89 1,3-DAP: 230H$_2$O 342 grams of water was combined with 13.6 grams of sodium hydroxide (50% w/w solution), 87.9 grams of sodium aluminate solution (23.5% wt. Al$_2$O$_3$, 19.6% wt. Na$_2$O) to form an aqueous solution. 42.9 grams of tetramethylammonium chloride solution (50% w/w, Sachem) and 43.6 grams of 1,3-diaminopropane ("1, 3-DAP") (SigmaAldrich) were mixed in to the aqueous solution. Finally, 700 grams of silica sol (40% wt. SiO$_2$, Nyacol) and 3.1 grams of CP 914C seeds (Zeolyst International) were added, and the resulting gel was stirred until it became homogenous.

Figure 17:
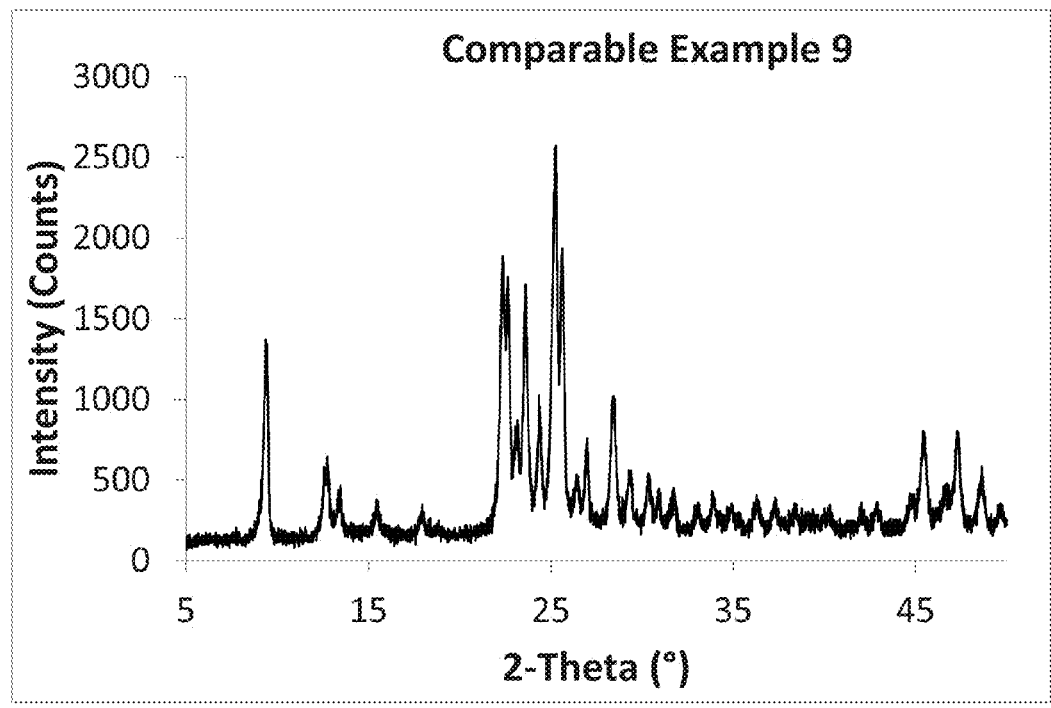
FIG. 17 is an XRD pattern of ferrierite material described in Comparable Example 9.
Figure 18:
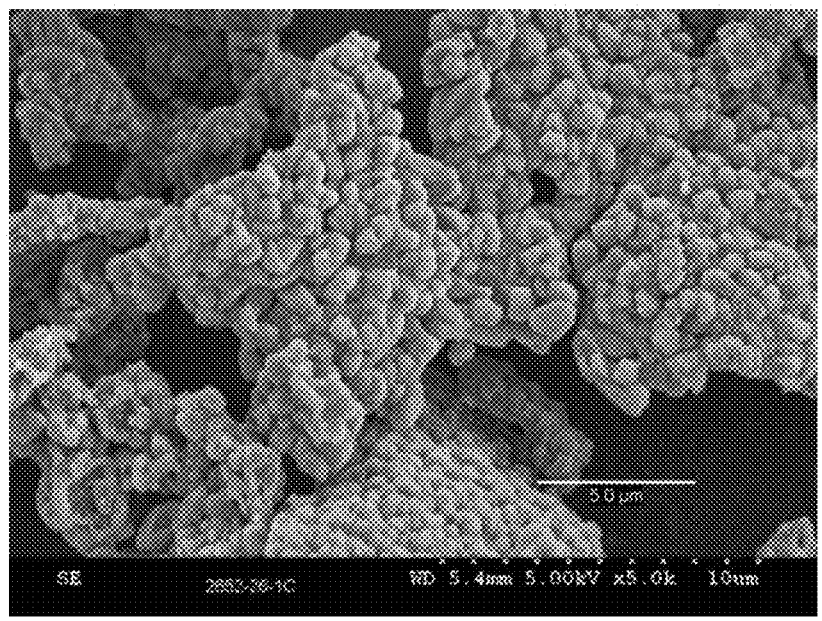
FIG. 18 is an SEM of ferrierite material described in Comparable Example 9.

The gel was heated at 180° C. for 36 hours. The gel was stirred with an anchor blade at 150 rpm during the heat up. Then the crystallization proceeded in static mode. The resulting crystalline product was filtered, washed with deionized water and dried in air at 105° C. The resulting zeolite powder was calcined at 550° C. for 6 hours to remove the organic molecules from the pores. The sample was found to be pure phase ferrierite. The X-ray diffraction pattern of the sample is shown in FIG. 17. The sample had a crystal size between about 1 micron and about 2 microns, as shown in the SEM image of FIG. 18.

Comparable Example 10

Figure 19:
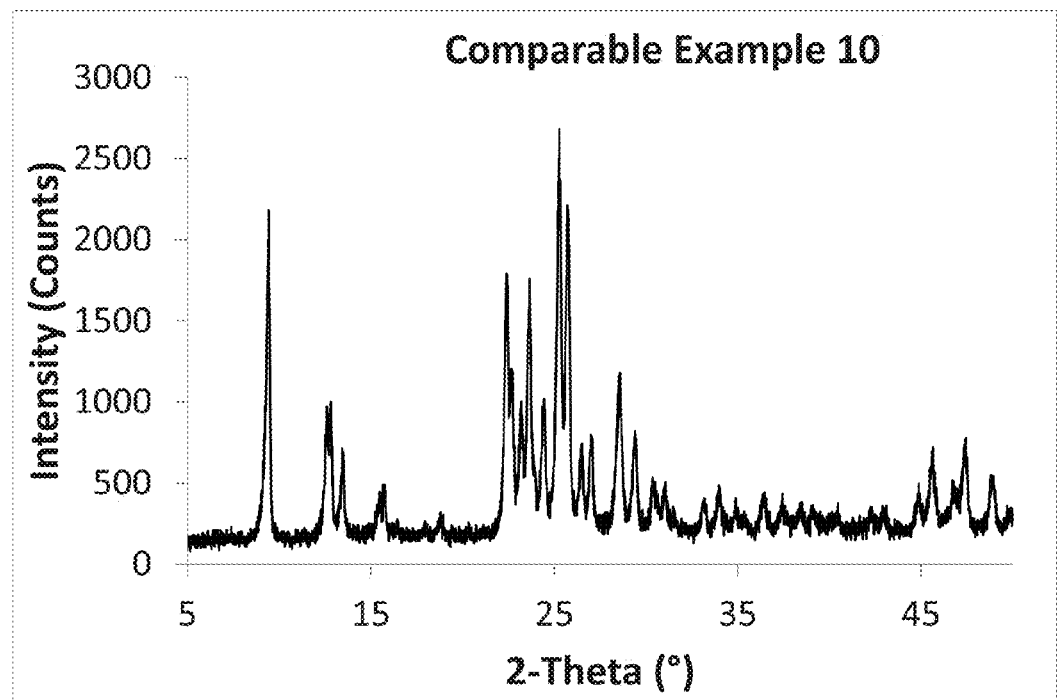
FIG. 19 is an XRD pattern of ferrierite material described in Comparable Example 10.
Figure 20:
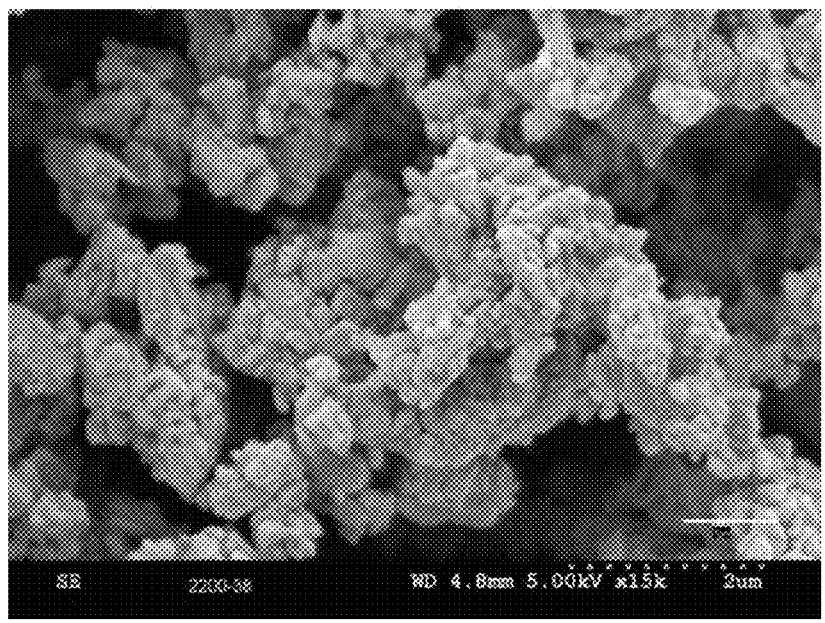
FIG. 20 is an SEM of ferrierite material described in Comparable Example 10.

This example describes CP 914C commercial small crystal zeolite, which is a pure phase ferrierite (Zeolyst International). The X-ray diffraction pattern of the sample is shown in FIG. 19. The sample consisted of irregularly shaped crystals having a particle size of about 200 nm to about 300 nm, as shown in the SEM image of FIG. 20.

Comparable Example 11

Figure 21:
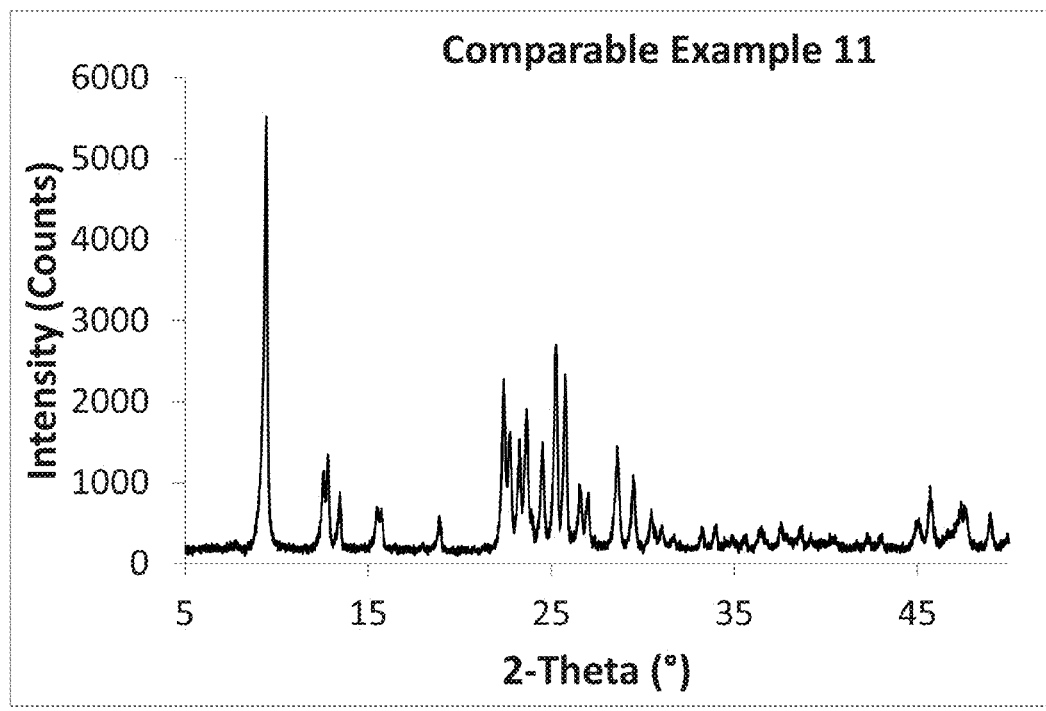
FIG. 21 is an XRD pattern of ferrierite material described in Comparable Example 11.
Figure 22:
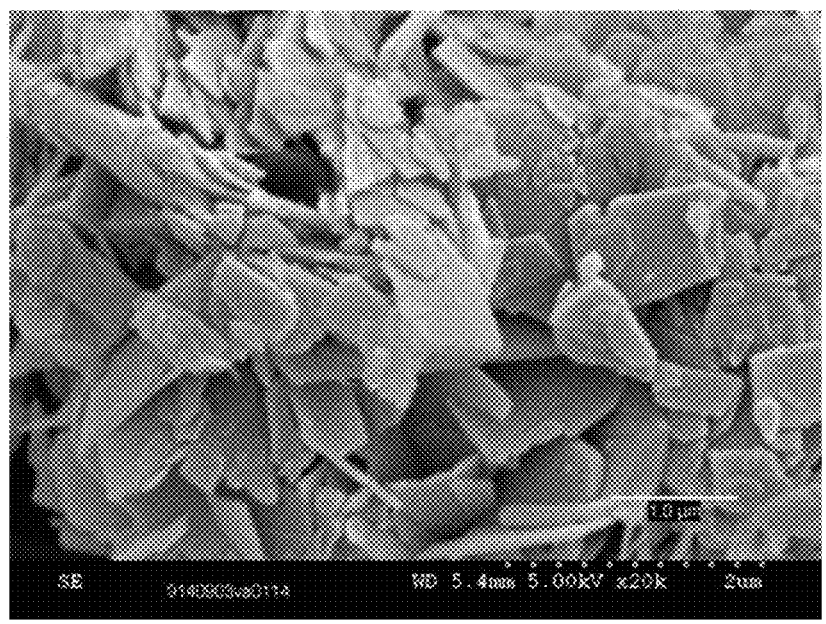
FIG. 22 is an SEM of ferrierite material described in Comparable Example 11.

This example describes CP 914 commercial zeolite, which is a pure phase ferrierite (Zeolyst International). The X-ray diffraction pattern of the sample is shown in FIG. 21. The sample consisted of plate-like crystals having a particle size ranging from about 0.5 microns to about 2 microns, as shown in the SEM image of FIG. 22.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

Other embodiments of the invention will be apparent to those skilled in the art from consideration of the specification and practice of the invention disclosed herein. It is intended that the specification and examples be considered as exemplary only, with the true scope of the invention being indicated by the following claims.

What we claim is:

1. A crystalline microporous material having a ferrierite (FER) framework type, a molar ratio of greater than about 10 of a first tetravalent metal oxide to a second tetravalent or trivalent metal oxide, and a mean crystal size of about 200 nm or less,
   wherein the crystalline microporous material has a surface area ranging from about 300 m$^2$/g to about 450 m$^2$/g and a micropore volume ranging from about 0.10 cc/g to about 0.20 cc/g.

2. The crystalline microporous material of claim 1, wherein said material has a crystal size of about 200 nm or less in all crystal dimensions.

3. The crystalline microporous material of claim 1, wherein said first tetravalent metal oxide comprises silica, said second tetravalent metal oxide comprises alumina, and wherein said molar silica to alumina ratio (SAR) ranges from about 10 to about 60.

4. The crystalline microporous material of claim 1, wherein said material has a mean crystal size of about 100 nm or less in all crystal dimensions.

5. The crystalline microporous material of claim 1, further comprising at least one hydrogenation-function metal.

6. The crystalline microporous material of claim 5, wherein said at least one hydrogenation-function metal is chosen from Pt, Pd, Rh, Ru, Ni, Re, and mixtures thereof.

7. The crystalline microporous material of claim 1, further comprising at least one transition metal for selective catalytic reduction of nitrogen oxides and/or catalytic decomposition of nitrous oxide.

8. The crystalline microporous material of claim 7, wherein said at least one transition metal is chosen from Cu and Fe.

9. A method of preparing a crystalline microporous material having a ferrierite (FER) framework type, a molar silica to alumina ratio (SAR) of greater than about 10, and a mean crystal size of about 200 nm or less, said method comprising
   forming a synthesis mixture comprising a silica source, an alumina source, an alkali metal source, and organic structure directing agents comprising:
      a first organic structure directing agent (OSDA-1), and
      a second organic structure directing agent (OSDA-2) that promotes ferrierite structure formation, wherein a molar ratio of OSDA-1 to OSDA-2 ranges from about 0.2 to about 1.0; and,
   heating the synthesis mixture to a temperature ranging from about 120 to about 200° C. for a period of time sufficient to crystallize the material, to form a crystalline microporous material having a surface area ranging from about 300 m$^2$/g to about 450 m$^2$/g and a micropore volume ranging from about 0.10 cc/g to about 0.20 cc/g.

10. The method of claim 9, wherein said OSDA-1 comprises a tetramethylammonium cation.

11. The method of claim 9, wherein said OSDA-2 is chosen from pyrrolidine, ethylenediamine 1,3-diaminopropane, 1-methylpyrrolidine, piperidine, pyridine and 1,4-diaminobutane.

12. The method of claim 9, wherein said organic structure directing agents comprise a tetramethylammonium cation and 1,3-diaminopropane.

13. The method of claim 9, wherein said organic structure directing agents comprise a tetramethylammonium cation and pyrrolidine.

14. A catalyst comprising a crystalline microporous material having a ferrierite (FER) framework type, a molar silica to alumina ratio (SAR) of greater than about 10, a surface area ranging from about 300 m$^2$/g to about 450 m$^2$/g, a micropore volume ranging from about 0.10 cc/g to about 0.20 cc/g, and a mean crystal size of about 200 nm or less in all dimensions, wherein said catalyst is catalytically active for at least one process chosen from hydrocarbon conversions, selective catalytic reduction of nitrogen oxides, and catalytic decomposition of nitrous oxide.

15. The catalyst of claim 14, further comprising at least one hydrogenation-function metal for hydrocarbon conversions.

16. The catalyst of claim 15, wherein said at least one hydrogenation-function metal is chosen from Pt, Pd, Rh, Ru, Ni, Re, and mixtures thereof.

17. The catalyst of claim 14, further comprising at least one transition metal for selective catalytic reduction of nitrogen oxides and/or catalytic decomposition of nitrous oxide.

18. The catalyst of claim 17, wherein said at least one transition metal is chosen from Cu and Fe.

* * * * *